United States Patent
Patton (10) Patent No.: US 7,599,719 B2
(45) Date of Patent: *Oct. 6, 2009

(54) TELEPHONE AND TELEPHONE ACCESSORY SIGNAL GENERATOR AND METHODS AND DEVICES USING THE SAME

(75) Inventor: John David Patton, Seattle, WA (US)

(73) Assignee: John D. Patton, Seattle, WA (US)

(*) Notice: Subject to any disclaimer, the term of this patent is extended or adjusted under 35 U.S.C. 154(b) by 608 days.

This patent is subject to a terminal disclaimer.

(21) Appl. No.: 11/058,488

(22) Filed: Feb. 14, 2005

(65) Prior Publication Data

US 2006/0183514 A1    Aug. 17, 2006

(51) Int. Cl.
*H04B 1/00*    (2006.01)
(52) U.S. Cl. .............. 455/575.1; 455/156.1; 455/159.1; 455/569.1
(58) Field of Classification Search .............. 455/575.2, 455/156.1, 159.1, 569.1
See application file for complete search history.

(56) References Cited

U.S. PATENT DOCUMENTS

| | | | |
|---|---|---|---|
| 4,509,190 A | | 4/1985 | Spector |
| 4,520,501 A | * | 5/1985 | DuBrucq .................... 704/271 |
| 4,586,905 A | * | 5/1986 | Groff ...................... 434/307 R |
| 4,823,380 A | * | 4/1989 | Kohen et al. ........... 379/387.02 |
| 4,918,438 A | * | 4/1990 | Yamasaki .................. 340/7.58 |
| 5,099,515 A | * | 3/1992 | Kobayashi et al. ............. 380/2 |
| 5,391,078 A | * | 2/1995 | Murphy ....................... 434/113 |
| 5,455,861 A | * | 10/1995 | Faucher et al. ............... 380/266 |
| 5,633,993 A | | 5/1997 | Redmann et al. |
| 5,640,685 A | * | 6/1997 | Komoda ....................... 455/72 |
| 5,708,724 A | * | 1/1998 | Burris et al. ................ 381/370 |
| 5,719,561 A | * | 2/1998 | Gonzales .................... 340/7.51 |
| 5,721,783 A | * | 2/1998 | Anderson ................... 381/328 |
| 5,765,134 A | | 6/1998 | Kehoe |
| 5,767,835 A | | 6/1998 | Obbink et al. |
| 5,781,848 A | * | 7/1998 | Komoda ....................... 455/72 |
| 5,903,628 A | | 5/1999 | Brennan et al. |
| 5,913,163 A | * | 6/1999 | Johansson ................. 455/426.1 |

(Continued)

FOREIGN PATENT DOCUMENTS

| | | |
|---|---|---|
| JP | 200099066 | 4/2000 |
| WO | 01/28221 A1 | 4/2001 |

OTHER PUBLICATIONS

GN Netcom, Inc., "GN 6110 User Guide", Nov. 20, 2003, 18 pages.*

(Continued)

*Primary Examiner*—Duc Nguyen
*Assistant Examiner*—Hai V Nguyen
(74) *Attorney, Agent, or Firm*—Darby & Darby PC (57) ABSTRACT

A device includes a telephone accessory configured and arranged to transmit an audio signal; and an audio effects generator coupled to the telephone accessory or a video effects generator. The audio effects generator can produce at least one user-initiated audio effect that is transmitted as part of the audio signal. The video effects generator can produce at least one user-initiated visual effect altering an image transmitted by the telephone accessory.

19 Claims, 7 Drawing Sheets

U.S. PATENT DOCUMENTS

| | | | |
|---|---|---|---|
| 5,974,142 A * | 10/1999 | Heer et al. | 379/442 |
| 5,995,935 A * | 11/1999 | Hagiwara et al. | 704/272 |
| 6,034,746 A | 3/2000 | Desai et al. | |
| 6,148,175 A * | 11/2000 | Freedland | 455/3.06 |
| 6,160,489 A * | 12/2000 | Perry et al. | 340/7.6 |
| 6,188,769 B1 | 2/2001 | Jot et al. | |
| 6,224,386 B1 * | 5/2001 | Suzuki | 434/252 |
| 6,266,418 B1 * | 7/2001 | Carter et al. | 380/257 |
| 6,304,576 B1 * | 10/2001 | Corley et al. | 370/408 |
| 6,328,570 B1 * | 12/2001 | Ng | 434/307 A |
| 6,359,550 B1 * | 3/2002 | Brisebois et al. | 340/407.1 |
| 6,363,139 B1 * | 3/2002 | Zurek et al. | 379/56.1 |
| 6,407,325 B2 * | 6/2002 | Yi et al. | 84/610 |
| 6,473,114 B1 | 10/2002 | Strubbe | |
| 6,510,325 B1 * | 1/2003 | Mack et al. | 455/575.2 |
| 6,611,592 B1 | 8/2003 | Sato et al. | |
| 6,683,938 B1 | 1/2004 | Henderson | |
| 6,724,298 B2 | 4/2004 | Smith | 340/407.1 |
| 6,738,457 B1 | 5/2004 | Pickering et al. | 379/88.16 |
| 6,754,336 B1 * | 6/2004 | Ito | 379/353 |
| 6,763,226 B1 * | 7/2004 | McZeal, Jr. | 455/90.2 |
| 6,856,817 B2 * | 2/2005 | Tischler | 455/569.1 |
| 6,882,715 B2 * | 4/2005 | Hom | 379/167.07 |
| 6,922,473 B2 * | 7/2005 | Turnbull | 381/74 |
| 6,963,839 B1 | 11/2005 | Ostermann et al. | |
| 6,975,240 B1 * | 12/2005 | Deacon | 340/692 |
| 6,999,920 B1 | 2/2006 | Matt et al. | |
| 7,006,976 B2 | 2/2006 | Glatt | |
| 7,027,832 B2 * | 4/2006 | Gum | 455/550.1 |
| 7,039,194 B1 | 5/2006 | Kemp et al. | |
| 7,058,067 B1 * | 6/2006 | Corley et al. | 370/408 |
| 7,065,219 B1 * | 6/2006 | Abe et al. | 381/74 |
| 7,079,454 B2 * | 7/2006 | Wellen | 368/230 |
| 7,089,042 B2 * | 8/2006 | Bodley | 455/569.1 |
| 7,103,389 B2 * | 9/2006 | Shibata | 455/567 |
| 7,110,799 B1 * | 9/2006 | Willins et al. | 455/575.2 |
| 7,123,715 B2 * | 10/2006 | Leung | 379/428.01 |
| 7,136,684 B2 * | 11/2006 | Matsuura et al. | 455/575.2 |
| 7,149,552 B2 * | 12/2006 | Lair | 455/569.1 |
| 7,159,008 B1 * | 1/2007 | Wies et al. | 709/206 |
| 7,251,507 B2 * | 7/2007 | Kitao et al. | 455/569.2 |
| 7,262,358 B2 * | 8/2007 | Lubbers | 84/625 |
| 7,272,561 B2 | 9/2007 | Miyazaki et al. | |
| 7,415,107 B1 * | 8/2008 | Williams | 379/373.01 |
| 2001/0034255 A1 | 10/2001 | Hayama et al. | |
| 2001/0043784 A1 | 11/2001 | Shirata et al. | |
| 2002/0110224 A1 | 8/2002 | Kovales et al. | |
| 2002/0110248 A1 | 8/2002 | Kovales et al. | |
| 2002/0115479 A1 * | 8/2002 | Tischler | 455/568 |
| 2002/0118848 A1 * | 8/2002 | Karpenstein | 381/119 |
| 2002/0151329 A1 * | 10/2002 | Prince et al. | 455/557 |
| 2003/0014246 A1 | 1/2003 | Choi | |
| 2003/0091204 A1 | 5/2003 | Gibson | |
| 2003/0107478 A1 | 6/2003 | Hendricks et al. | |
| 2003/0138080 A1 | 7/2003 | Nelson et al. | |
| 2003/0165243 A1 * | 9/2003 | Liu | 381/74 |
| 2003/0195749 A1 * | 10/2003 | Schuller | 704/258 |
| 2003/0223602 A1 * | 12/2003 | Eichler et al. | 381/309 |
| 2004/0007120 A1 * | 1/2004 | Futamase et al. | 84/622 |
| 2004/0010464 A1 * | 1/2004 | Boaz | 705/40 |
| 2004/0014459 A1 | 1/2004 | Shanahan | |
| 2004/0022371 A1 | 2/2004 | Kovales et al. | |
| 2004/0029086 A1 * | 2/2004 | Burg et al. | 434/187 |
| 2004/0058674 A1 * | 3/2004 | Yoakum | 455/416 |
| 2004/0063475 A1 * | 4/2004 | Weng | 455/575.6 |
| 2004/0147282 A1 * | 7/2004 | Nakasato et al. | 455/552.1 |
| 2004/0156616 A1 * | 8/2004 | Strub et al. | 386/46 |
| 2004/0219925 A1 * | 11/2004 | Ahya et al. | 455/450 |
| 2005/0026568 A1 * | 2/2005 | Hawker et al. | 455/70 |
| 2005/0037742 A1 * | 2/2005 | Patton | 455/414.1 |
| 2005/0075169 A1 * | 4/2005 | Cheng et al. | 463/39 |
| 2005/0129259 A1 * | 6/2005 | Garner | 381/172 |
| 2005/0136839 A1 * | 6/2005 | Seshadri et al. | 455/41.2 |
| 2005/0141680 A1 * | 6/2005 | Tucker et al. | 379/88.18 |
| 2005/0153748 A1 * | 7/2005 | Bodley | 455/569.1 |
| 2005/0190298 A1 | 9/2005 | Kurashige | |
| 2005/0231642 A1 * | 10/2005 | Roman et al. | 348/578 |
| 2005/0232445 A1 * | 10/2005 | Vaudrey et al. | 381/109 |
| 2005/0260953 A1 * | 11/2005 | Lefler et al. | 455/100 |
| 2005/0271218 A1 * | 12/2005 | Peng | 381/74 |
| 2005/0272477 A1 * | 12/2005 | Boykins et al. | 455/569.1 |
| 2006/0050890 A1 * | 3/2006 | Tsuhako | 381/27 |
| 2006/0075439 A1 * | 4/2006 | Vance | 725/81 |
| 2006/0084504 A1 * | 4/2006 | Chan et al. | 463/39 |
| 2006/0087941 A1 * | 4/2006 | Obradovich | 369/47.12 |
| 2006/0116073 A1 * | 6/2006 | Richenstein et al. | 455/3.06 |
| 2006/0229108 A1 * | 10/2006 | Cehelnik | 455/569.1 |
| 2006/0287014 A1 * | 12/2006 | Matsuura et al. | 455/575.2 |
| 2007/0004464 A1 * | 1/2007 | Lair et al. | 455/569.1 |
| 2007/0010288 A1 * | 1/2007 | Willins et al. | 455/556.1 |
| 2007/0123207 A1 * | 5/2007 | Terlizzi | 455/403 |
| 2007/0178944 A1 * | 8/2007 | Mitsuru et al. | 455/569.1 |
| 2007/0270184 A1 * | 11/2007 | Hurula et al. | 455/557 |

OTHER PUBLICATIONS

Todd Ogasawara, "The Motorola MPx200 Smartphone 2002", Jan. 30, 2004, O'Reilly Wireless Devcenter, 11 pages.*
Becky Morris, "Beyond Hearing Aids", Newsletter, Dec. 2004, www.beyondhearingaids.com, 2 pages.*

* cited by examiner

TELEPHONE AND TELEPHONE ACCESSORY SIGNAL GENERATOR AND METHODS AND DEVICES USING THE SAME

FIELD

The present inventions are directed to the area of telephones, including mobile telephones, telephone accessories such as telephone headsets, and methods and devices using telephones and telephone accessories such as telephone headsets. The present inventions are also directed to the area of audio and visual effects generators for use with telephones, including mobile telephones, telephone accessories such as telephone headsets, and methods and device using such generators and telephones and telephone accessories such as telephone headsets.

BACKGROUND

Telephones, particularly mobile telephones, are becoming increasingly important in the lives of many people. The use of mobile telephones has grown dramatically and these devices are now a fixture in our society. It is now common to see people walking down the street, riding a bus, or having a meal while talking on a telephone. These devices can allow people to conduct their personal and professional business in a more efficient manner because they can communicate directly with others and receive immediate feedback. Mobile telephones allow people to convey desired information to others.

The telephone has also changed over time. Now telephones can be separate devices or they can include other devices, such as a personal desk assistant (PDA), a camera, or a video camera. In addition, telephones need not establish a dedicated point-to-point connection, but the telephone signal can be divided into separate packets and transmitted to the other telephone over wired or wireless (or combinations of wired and wireless) networks.

Telephone remote accessories have also proliferated. Telephone remote accessories include telephone headsets, both wired and wireless, as well as automobile products that allow a telephone to function "hands free" through an automobile's built-in audio and entertainment system. These accessories can allow users to benefit from some or all of a telephone's functions without actually hand-holding or handling the actual telephone. In the case of a telephone handset, the user might access telephone features and control basic telephone functions with buttons on the headset itself. In the case of an automobile system, the user might access telephone features and control basic telephone functions by interacting with buttons or knobs on the automobile's dash or steering wheel.

The increased accessibility associated with mobile telephones can have great advantages, but it can also be inefficient, disruptive, or distracting when unwanted phone calls are received or a caller lingers on the line too long. It can be difficult to find a socially acceptable method to end or postpone the call.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present inventions are directed to the area of telephones, including mobile telephones, telephone accessories such as telephone headsets and automobile "hands free" systems, and methods and devices using telephones and telephone accessories such as telephone headsets and automobile "hands free" systems. The present inventions are also directed to the area of audio and visual effects generators for use with telephones, including mobile telephones, telephone accessories such as telephone headsets and automobile "hands free" systems, and methods and device using such generators and telephones and telephone accessories such as telephone headsets and automobile "hands free" systems. The inventions can be realized using hardware, software, or combinations thereof.

A telephone includes an audio or visual effects generator (or both) that can alter audio signals or items of visual information that are transmitted over the telephone. Examples of such systems are described in U.S. Provisional Patent Application Ser. No. 60/495,299 and U.S. patent application Ser. No. 10/917,627, both of which are incorporated herein by reference. Telephone accessories such as a telephone headsets and automobile "hands free", navigation, video, and audio systems can also include an audio or visual effects generator (or both). For example, an audio effects generator can add sounds, modify sounds, intermittently halt the audio signal, or otherwise alter the audio signal transmitted by the telephone. A visual effects generator can alter, for example, the background or foreground of images or video transmitted over the telephone.

Figure 1:
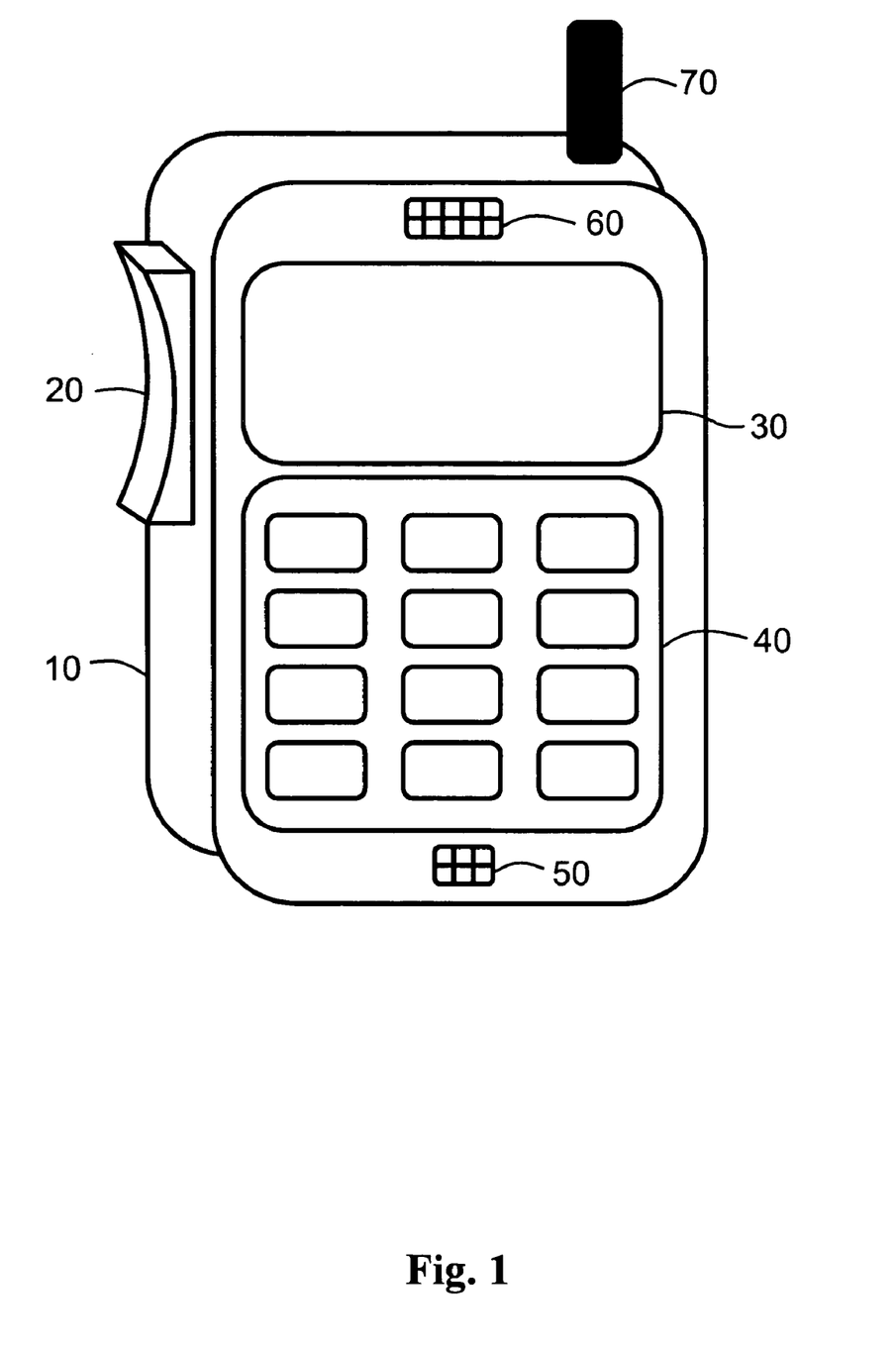
FIG. 1 is a schematic perspective view of a telephone.

FIG. 1 schematically illustrates one example of a telephone. The telephone includes a telephone body 10, one or more buttons 20, a screen 30, a keypad 40, a microphone 50, a speaker 60, and an antenna 70. The telephone can also include other components such as, for example, a camera, a video camera, a cover, a headset, an i/o (input/output) port (for example, a serial, USB, IR, or RF port), removable memory devices, and the like.

Although the illustrated telephone is a mobile phone, it will be understood that other telephones can be used including, for example, cordless telephones and corded telephones (in which case the antenna 70 is replaced with a cord attached to a base unit or a telephone line.) Telephones include devices such as cellular telephones, internet phones, and smart phones, as well as personal desk assistants (PDA's) and other mobile devices that have audio or visual messaging capabilities.

The telephone can communicate using analog or digital signals over wired, wireless, or combinations of wired and wireless networks. The audio signal or visual information from the telephone can be a continuous or intermittent point-to-point transmission between telephones or the audio signal or visual information can be transmitted as one or more separate packets of data sent from one telephone and reassembled by the other telephone. The packets of data can be transmitted on wired or wireless networks or combinations thereof. The packets of data may follow the same path or they may be conveyed over different paths. Any method of transmitting and receiving the packets of data can be used to convey the audio signal/visual information including methods utilizing communication protocols such as, for example, global system for mobile communications (GSM), code division multiple access (CDMA), Institute for Electrical and Electronics Engineers (IEEE) 802.11, IEEE 802.16 (WiMax), user datagram protocol (UDP), transmission control protocol/Internet protocol (TCP/IP), SMS, general packet radio service (GPRS), Wireless Application Protocol (WAP), voice over internet protocol (VoIP), and the like.

The telephone body 10 can have any shape, size, and color. The screen 30 can be any type of display screen including, but not limited to, a black and white or color LCD screen. Generally, mobile phones have a screen, but other phones such as, cordless and corded phones, may or may not have a screen.

The microphone 50 receives sound from the user. This sound is then converted into an audio signal and sent to another telephone. The speaker 60 produces sounds for the user based on the audio signal from both the user's telephone and the other telephone. In addition to audio signals, information, such as pictures or videos, can also be transmitted by the telephone. The antenna 70 allows the reception and transmission of audio signals or other information. As indicated above, the antenna can be replaced by a cord for reception and transmission of audio signals.

The keypad 40 allows the user to input information, such as telephone numbers, contact names, etc., into the telephone. Other input information and commands can be provided to the telephone by the keypad 40. The telephone can also include other buttons, switches, and the like, such as button 20, to provide additional input to the telephone. Such input can be, for example, scrolling through a menu using buttons or keys, selecting items on the menu, activating or deactivating the telephone, increasing or decreasing the volume of the speaker, increasing or decreasing the volume of a ring tone, accessing messages, and the like.

Figure 2:
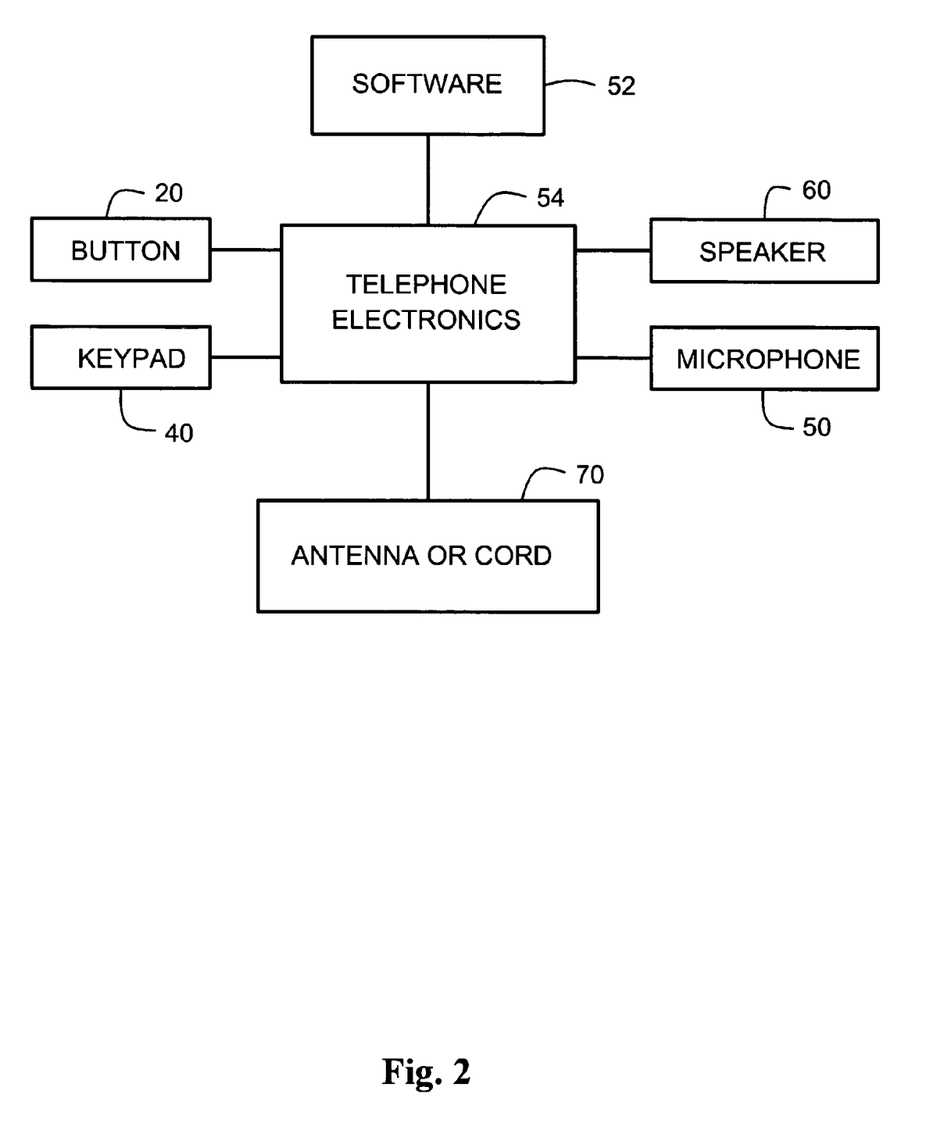
FIG. 2 is a schematic drawing of components of one embodiment of a telephone, according to the inventions.

FIG. 2 is a schematic illustration of components of the telephone including the button 20, keypad 40, microphone 50, speaker 60, antenna/cord 70 which are all coupled to the telephone electronics 54. The telephone electronics 54 typically includes a microprocessor 56, an audio effects generator 55 or visual effects generator 57 (or both), memory 59, and other electronic circuitry that control the operation of the telephone, as illustrated schematically in FIG. 3.

The operation of the telephone can be managed by software 52 that operates with the microprocessor and other electronics to control the telephone. Alternatively or additionally, the operation of the telephone or a portion of the operation of the telephone can be performed using hardware in place of software.

Figure 3:
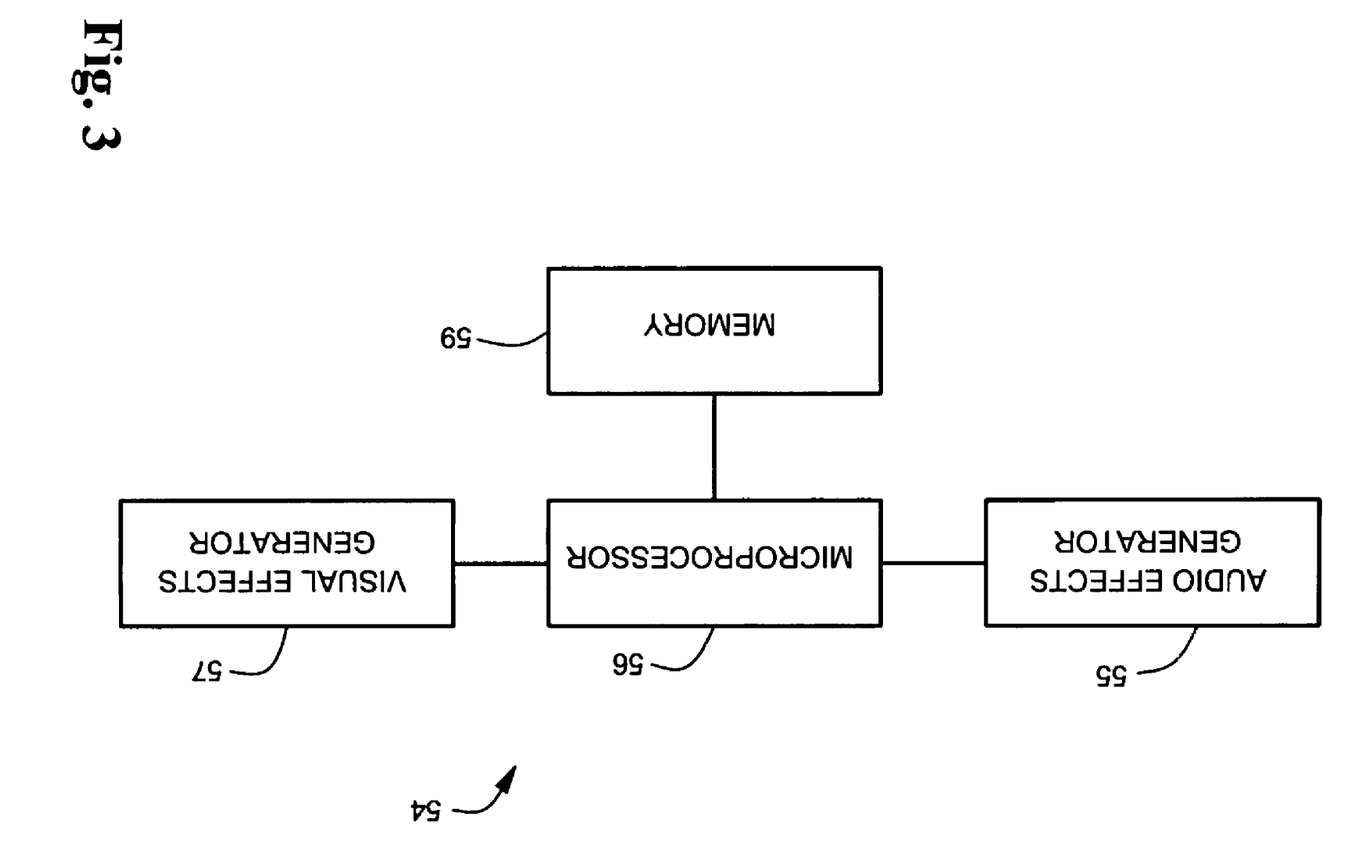
FIG. 3 is a schematic drawing of control and effects components of one embodiment of a telephone, according to the inventions.

The software 52 can be permanently stored in the memory 59, or can be removable or modifiable, or some components of the software are permanent and some are removable or modifiable. As telephones become more sophisticated and flexible, the software generally does as well. At least some mobile telephones use a flexible operating system, such as the Symbian™ operating system, that allows the telephone to utilize a variety of programming that can be downloaded or otherwise supplied to the telephone. This gives the user flexibility in selecting telephone features, applications, games, dial tones, ring tones, music, display images, and the like.

Any type of memory 59 can be used including, for example, RAM, ROM, EEPROM, flash memory, or other memory technology. The memory can be used to store the software and other information, such as telephone numbers, contact lists, audio or video files, and the like.

The audio or visual effects generator can be implemented using hardware, software, or both. The audio or visual effects generator can be built into the telephone or can be added to the telephone by, for example, loading software onto the telephone, adding hardware into the telephone, attaching a retrofit unit to the telephone, or any combination thereof. For example, the audio or visual effects generator can include software stored in memory in the telephone, a mechanical device disposed in or attached to the telephone, an electronic circuit disposed in or attached to the telephone, or any combination thereof.

An audio or visual effect can be activated by, for example, pushing one or more of the buttons 20, pushing a key or a combination of keys on the keypad 40, pushing a combination of key(s) and button(s), or selecting the effect from a menu shown on display 30. For example, the user may push button 20 or push the "1" key three times to activate an audio effect. There may be more than one method to activate an audio or visual effect. For example, the effect can be activated by actuating button(s)/key(s) and by selecting a menu entry. Typically, each audio or visual effect will be activated differently by, for example, a different key/button or combination of button(s)/key(s) or a different menu choice. In some embodiments, the user can select which button/key or combination of buttons/keys activates the audio or visual effect. In some embodiments and for some or all of the audio and visual effects, characteristics of the audio or visual effect, such as length, volume, pitch, number, color, brightness, and the like, can be selected by, for example, a button/key or combination of buttons/keys, the length of time that the button or key or combination is pushed, selection from a menu, or by stored values that were previously selected by the user or default values initially set on the telephone.

Figure 4:
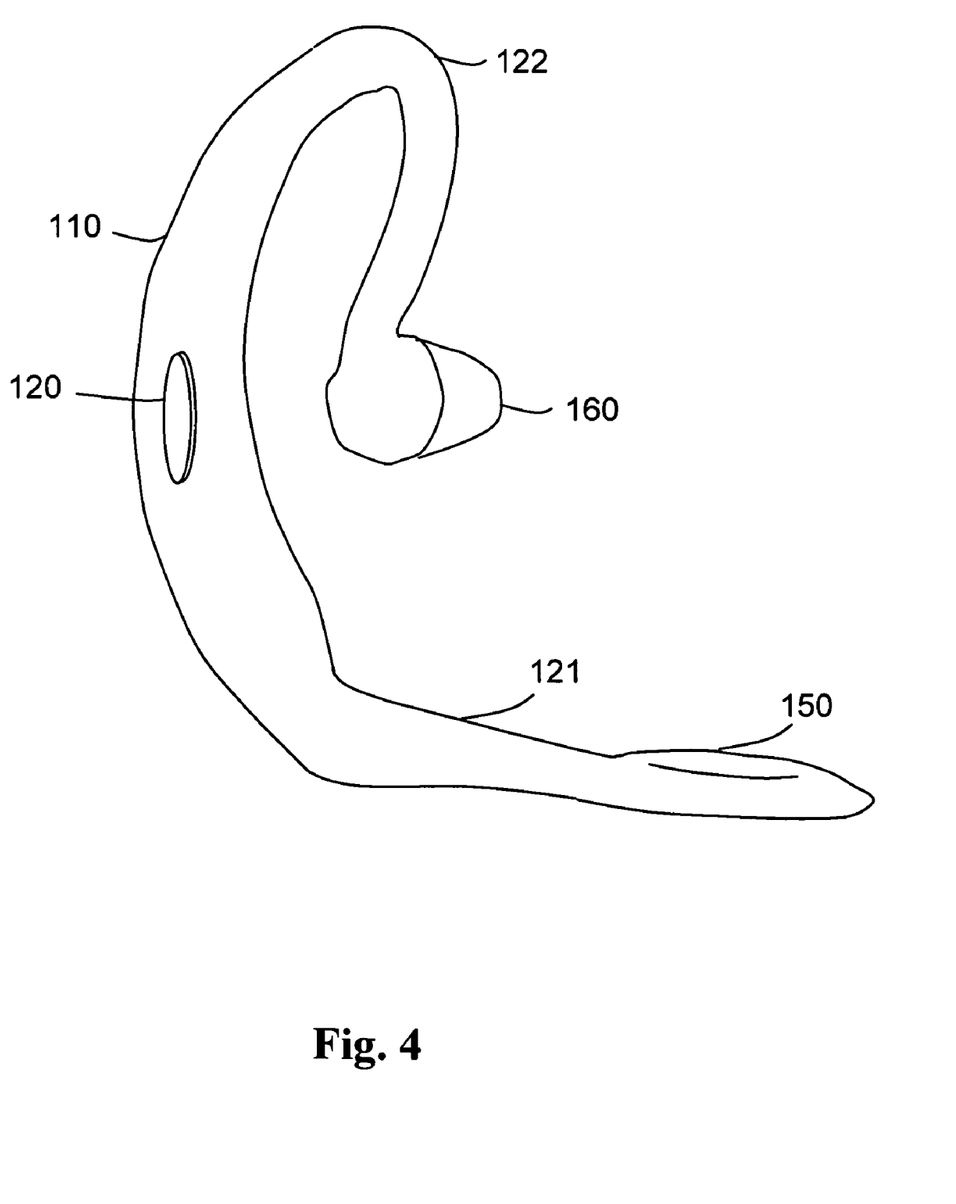
FIG. 4 is a schematic perspective view of a telephone headset.

FIG. 4 schematically illustrates one example of a telephone headset. The telephone headset includes a bracket 122 for attaching the telephone headset to the user's head or ear, a microphone boom 121, one or more buttons 120, a microphone 150, a speaker 160 and an antenna (not shown). It will be understood that this is one example of a telephone headset and that other telephone headsets may include fewer or more components.

Although the illustrated telephone headset is a wireless mobile headset, it will be understood that a corded telephone headset could be used, and that other telephone accessories can provide analogous functions and benefits for a user such as in-car stereo and speaker systems which offer "hands free" use of the telephone, as well as automobile audio, video, and navigation systems. The telephone headset and automotive "hands free" system will be described below, but it will be understood other telephone accessories can be configured and operated similarly.

The telephone headset can communicate using analog or digital signals over wired, wireless, or combinations of wired and wireless connections. The audio signal or visual information from the telephone headset can be a continuous or intermittent point-to-point transmission between telephone headset and a receiving telephone or the audio signal or visual information can be transmitted as one or more separate packets of data sent from the telephone headset and reassembled by the receiving telephone. The receiving telephone is, in some embodiments, a telephone of the user that then sends the audio signal or visual information to another person with whom the user is in communication. In other embodiments, the telephone headset can be in direct communication with the other person without an intervening user's telephone. The packets of data can be transmitted on wired or wireless connections or combinations thereof. The packets of data may follow the same path or they may be conveyed over different paths. Any method of transmitting and receiving the packets of data can be used to convey the audio signal/visual information including methods utilizing communication protocols such as, for example, Bluetooth, Zigbee, Institute for Electrical and Electronics Engineers (IEEE) 802.11, IEEE 802.16 (WiMax), user datagram protocol (UDP), transmission control protocol/Internet protocol (TCP/IP), SMS, Wireless Application Protocol (WAP), voice over internet protocol (VoIP), and the like.

The telephone headset body 110 can have any shape, size, and color. The microphone 150 receives sound from the user. This sound is then converted into an audio signal and sent to a telephone. The speaker 160 produces sounds for the user based on the audio signal from both the user's telephone headset (and, optionally, telephone) and the other telephone. In addition to audio signals, information, such as pictures or videos, can also be transmitted by the telephone. The antenna (which is often internal) allows the reception and transmission of audio signals or other information. As indicated above, the antenna can be replaced by a cord for reception and transmission of audio signals.

The telephone headset can include other buttons, switches, and the like, such as button 120, to provide input to the telephone headset. Such input can be, for example, activating or deactivating the telephone headset, increasing or decreasing the volume of the speaker, increasing or decreasing the volume of a ring tone, accessing messages, and the like.

Figure 5:
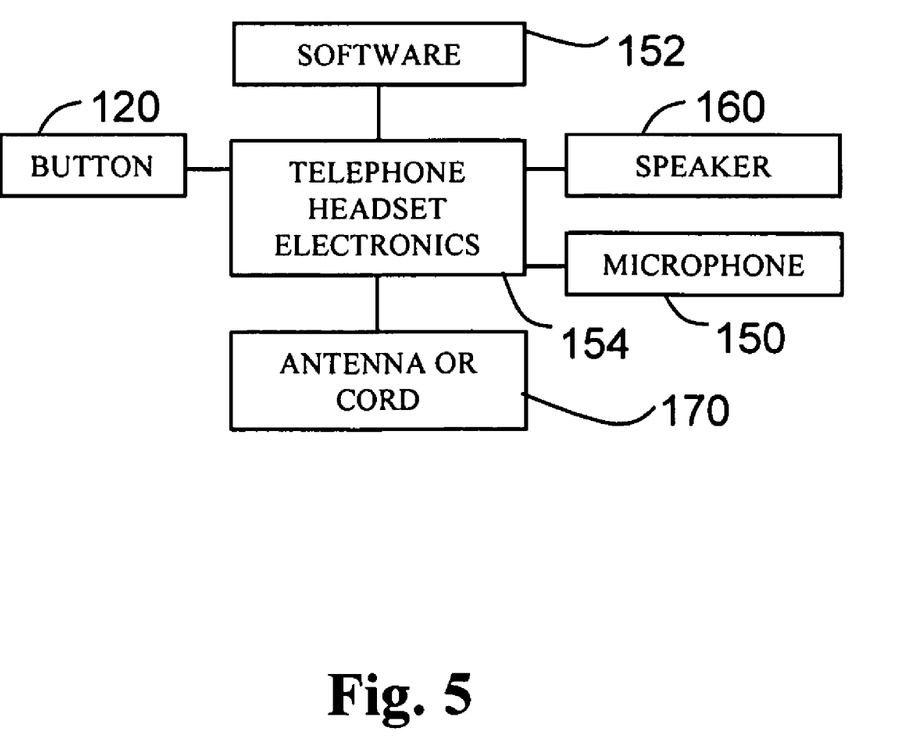
FIG. 5 is a schematic drawing of components of one embodiment of a telephone headset, according to the inventions.

FIG. 5 is a schematic illustration of components of the telephone including the button 120, microphone 150, speaker 160, antenna/cord 170 which are all coupled to the telephone headset electronics 154. The telephone headset electronics 154 typically includes a microprocessor 156, an audio effects generator 155 or visual effects generator 157 (or both), memory 159, and other electronic circuitry that control the operation of the telephone headset as illustrated schematically in FIG. 6. In another embodiment, the telephone headset electronics 154 or portions of the telephone headset electronics 154 may be provided in the user's telephone.

Figure 6:
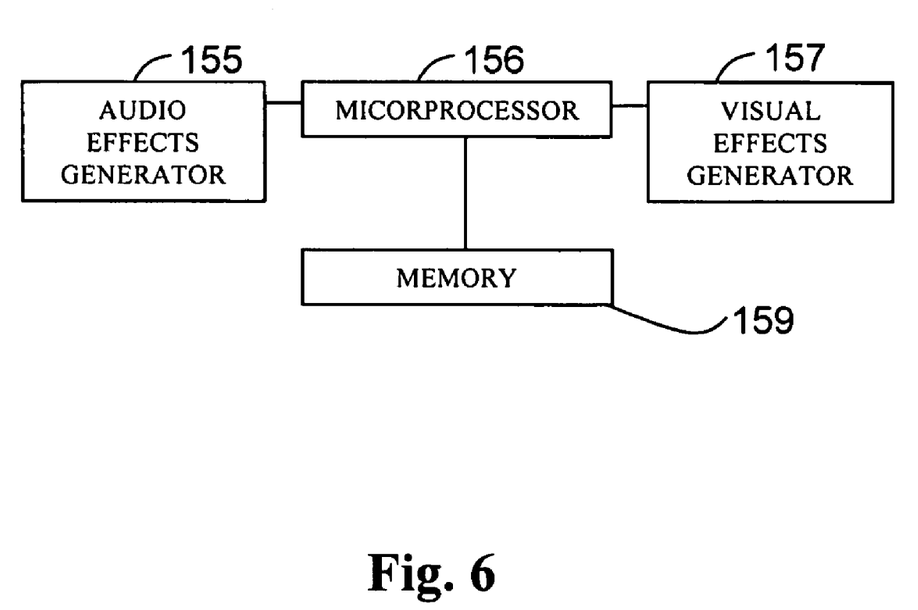
FIG. 6 is a schematic drawing of control and effects components of one embodiment of a telephone headset, according to the inventions.

The operation of the telephone headset can be managed by software 152 that operates with the microprocessor and other electronics to control the telephone headset. Alternatively or additionally, the operation of the telephone headset or a portion of the operation of the telephone headset can be performed using hardware in place of software. The software 152 can be permanently stored in the memory 159, or can be removable or modifiable, or some components of the software are permanent and some are removable or modifiable.

Any type of memory 159 can be used including, for example, RAM, ROM, EEPROM, flash memory, or other memory technology. The memory can be used to store the software and other information, such as telephone numbers, contact lists, audio or video files, and the like.

The audio or visual effects generator can be implemented using hardware, software, or both. The audio or visual effects generator can be built into the telephone headset or can be added to the telephone headset by, for example, loading software onto the telephone headset, adding hardware into the telephone headset, attaching a retrofit unit to the telephone headset, or any combination thereof. For example, the audio or visual effects generator can include software stored in memory in the telephone headset, a mechanical device disposed in or attached to the telephone headset, an electronic circuit disposed in or attached to the telephone headset, or any combination thereof.

An audio or visual effect can be activated by, for example, pushing one or more of the buttons 120. For example, the user may push button 120. There may be more than one method to activate an audio or visual effect. For example, the effect can be activated by actuating button(s)/key(s) and by selecting a menu entry. Typically, each audio or visual effect will be activated differently by, for example, a different key/button or combination of button(s)/key(s) or a different menu choice. In some embodiments, the user can select which button/key or combination of buttons/keys activates the audio or visual effect. In some embodiments and for some or all of the audio and visual effects, characteristics of the audio or visual effect, such as length, volume, pitch, number, color, brightness, and the like, can be selected by, for example, a button/key or combination of buttons/keys, the length of time that the button or key or combination is pushed, selection from a menu, or by stored values that were previously selected by the user or default values initially set on the telephone headset.

Figure 7:
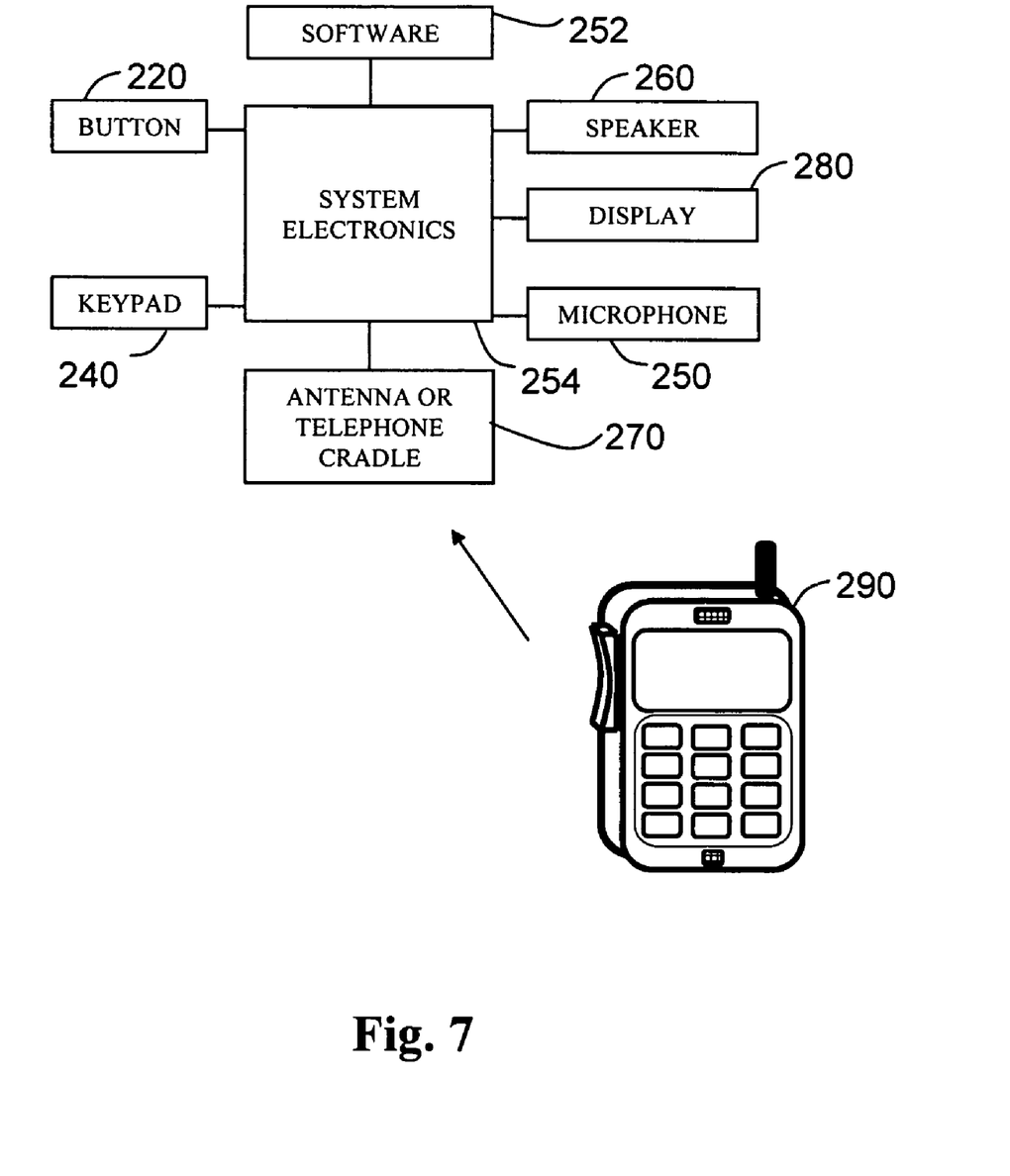
FIG. 7 is a schematic drawing of components of one embodiment of a automobile "hands free" telephone accessory system, according to the inventions.

FIG. 7 is a schematic illustration of components of an automotive "hands free" telephone accessory system including one or more buttons 220, a microphone 250, a speaker 260, and an optional display 280 which are all coupled to a user's telephone 290 via antenna, cord, or cradle 270. Commercial automotive "hands free" systems, which commonly use the Bluetooth wireless protocol to communicate with the user's telephone 290, include, for example, Acura's Hands-FreeLink™ and Chrysler's UConnect™. Other manufacturers, including BMW and Lexus, have analogous systems. Typically these systems work by using a standardized wireless protocol, such as Bluetooth, to recognize when the user's telephone 290 is in the car and then use this wireless protocol to allow the user to control some or all of the telephone functions using the buttons 220, the microphone 250, the speaker 260, and the display 280.

As with the embodiments described earlier, the audio or visual effects generator can be implemented using hardware, software, or both, and the user may activate an audio or visual effect by, for example, pushing one or more of the buttons 220.

The audio effects generator of the telephone or telephone accessory can produce one or more of the audio effects described below. The audio effects generator alters the audio signal to produce the effect. The audio effects generator can, for example, add sounds to the audio signal, modify sounds in the audio signal, intermittently disrupt the audio signal to create gaps, and the like. The audio effects generator can achieve these effects using any method know to those of skill in the art including, but not limited to, altering the electronics in the telephone by adding or deleting analog, digital or rf components; changing characteristics of the analog, digital, or rf electronics; creating shorts in the telephone circuitry; altering characteristics of the digital or analog signal transmitted by the telephone or telephone accessory; or creating sounds that are picked up by the microphone 50, 150, or 250. The audio effects are typically heard by the user, but, in some embodiments, the audio effects are not heard by user but are transmitted to the other telephone. In some embodiments, the user and person on the other telephone will hear different effects.

In some embodiments, the audio or visual effect is performed using software or a combination of software and hardware. The software can be provided with the telephone or telephone accessory, or, in some embodiments, downloaded or otherwise supplied to the telephone or telephone accessory. Downloaded software can be provided by a software provider free, for a fee, or free for a limited period of time at which time the software deactivates unless the user pays a fee or performs other acts, such as registration, required by the software provider to continue use of or reactivate the software.

One type of audio effect simulates notification of an incoming call on a separate line. Users with multiple-line telephones or with call waiting features are typically alerted to incoming calls by audio notification. This notification can be in the form of beeps or clicks. These audio alerts are also often signaled to the person on the other side of the line by beeps, clicks, or brief gaps in the audio signal. These distinctive audio effects alert the other person to the fact that the user has an incoming call and may want to postpone or end the current call. The ability for a user to create these distinctive audio effects on demand and thus provide evidence for an incoming call allows a user to excuse himself or herself from the original conversation in a manner that is generally socially acceptable.

To achieve this audio effect, the audio effects generator produces audible clicks, beeps, or gaps when the user activates the audio effect. The audio effect is typically heard through the speaker 60, 160, or 260, and transmitted to the other telephone via antenna 70 (or a corresponding cord) or via antenna or cord 170 or via antenna, cord, or cradle 270. The audio effect generator may also allow the user to create a longer gap in the audio connection to simulate the user speaking with a person on the other line. This could also be simulated using a telephone's "hold" function. This audio effect can be particularly useful with callers that are lingering on the line or callers with whom the user does not wish to continue conversing, such as telemarketers.

Another optical effect simulates a poor quality connection between the user and the other telephone. Partially intelligible, unintelligible, and dropped wireless phone connections are a common and often irritating problem with wireless phone systems. Many patents and many millions of dollars have been devoted to improving the reliability and quality of wireless telephone calls. However, when a telephone user does not want to continue a phone conversation, having a poor quality telephone connection can actually benefit the user in that a poor quality connection provides the user with a socially acceptable reason to end or postpone a telephone call.

This audio effect can be used to simulate poor connections or degradation in the connection for analog or digital mobile phones, as well as cordless and corded phones. Moreover, a corded phone (or any other telephone) user may also simulate poor mobile phone connections when the user knows that the other party is on a mobile phone.

The audio effect can simulate, for example, gaps in transmission or interference (for example, static, high pitched sounds, fading or other changes in sound volume, garbled language, or intermittent gaps or periods of silence.) Optionally, the length or severity (e.g., number of gaps, volume of interference, or frequency of interference) of the optical effect can be controlled. For example, the user may select only a brief interruption in the audio signal or intermittent interruption over a random schedule, such as random gaps in transmission of the audio signal. In some embodiments, the optical effect generator allows the user the option to automatically or manually terminate the call as a result of the "poor connection". As one example, a short press of the button 20, 120, or 220 may only briefly interrupt the audio signal to and from the speaker 60, 160, or 260 and the microphone 50, 150, or 250, while a long continuous press of the button 20, 120, or 220 may cause the audio signal to be intermittently interrupted on a random schedule and the call in progress ultimately terminated.

Another audio effect alters the voice of the user. Alterations include, but are not limited to, changing the pitch of the voice higher or lower, simulating an echo chamber, masking a voice, and changing the voice to a different sound such as a more electronic, musical, or robotic sound. More sophisticated alterations include simulating accents or the voices of others, such as famous individuals. Such alterations may include altering pitch of the voice in a variable manner, altering sounds (particularly vowel sounds), and changing cadence of the voice.

Another audio effect translates the words of the user. This can be accomplished using any methods known to those of skill in the art. For example, in one method, the audio effects generator includes voice recognition software or hardware so that the audio effects generator is able to recognize the words spoken by the user and then those words can be translated using translating software or hardware. The translated words can then be spoken using a library of previously recorded words or using speech simulation software or hardware. Alternatively or additionally, the words spoken on the other telephone can be translated by the user. Selection of the language for translation can be automatic or manual.

Yet another audio effect includes introducing background sound effects. Examples of such sound effects include office sounds, traffic sounds, airport sounds, street sounds, outdoor sounds, wilderness sounds, ocean or lake sounds, sports or sporting event sounds, gunfight, screaming, orgasm (his or hers), stadium sounds, auction sounds, circus or carnival sounds, maritime sounds (waves, birds, foghorns), canned laughs, quotes from famous people (George Bush, movie stars, etc.), and horse race sounds. Other possible background sound effects include the voices of others. For example, a background sound could be a voice asking for the user or a voice of a specific person to simulate the presence of that person in the vicinity of the user. These background sounds can be added to the audio signal by the audio effects generator. The background sound effects can be for the duration of the call, for a portion of the call, or momentary. Optionally, the user can turn the background sound effects on and off during the call. The background sound effects may be different for the user and the other telephone or the user may not hear any of the background sound effects that are sent to the other telephone. The user may also be able to select other characteristics of the sound effects, such as volume or pitch.

In some embodiments, the selection of a background sound effect (or any other audio or visual effect) and, optionally, the setting for characteristics of the effect can be associated with a particular party that the user is calling so that the effect is automatically activated when that party is called. The user can manually alter, adjust, or cancel the effect. The user can also reprogram which effect is associated with the party.

These background sound effects, or any other sound effects, can be recorded and stored for use by the audio effects generator or the sound effects can be generated by the audio effects generator 55 or 155. The telephone or telephone accessory optionally allows the user to record background sound effects including environmental sounds (e.g., traffic, wilderness, airport, and ocean sounds, as well as others described above). The ability to record sounds is particularly useful when the user is recording in a place that has a unique or distinguishable sound environment. Alternatively or additionally, the telephone or telephone accessory allows the user to obtain background sound effects from the Internet or from other sources. Optionally, the telephone or telephone accessory will loop the recorded background sound effect so that once the effect ends it will immediately start again.

A visual effects generator can be used to modify visual information sent over the telephone. Visual information includes, but is not limited to, pictures, animations, cartoons, videos and video clips, icons, paintings, drawings, and the like. Many mobile telephones, as well as other telephones, have cameras that allow users to take pictures or produce video. Such cameras can allow the user to share pictures or video taken by the user with someone on the telephone line or to allow the other person on the line to see the user. The visual effects generator allows the user to modify elements of the background or foreground (or both) of the visual information. The visual effects generator can achieve these effects using any method known to those of skill in the art including, but not limited to, replacing a foreground or background image with a previously obtained image or a computer-generated image; and altering a characteristic of a foreground or background image such as, for example, color, shade, texture, shape, position, orientation, motion, brightness, focus, or contrast. The visual effects generator typically manipulates the signal transmitted by the telephone to alter the visual information sent to the other telephone in order to achieve the desired effect. Such alterations can include altering an image file before or during transmission of the file to the other telephone.

As one visual effect, the background of a picture, video, or other visual information is altered. In one embodiment, a foreground image is determined, the background or a portion of the background is then removed, and a new background replaces the old. The new background can be a previously recorded background; a background obtained from another source, such as the Internet or a service provider; or a computer-generated background. The new background can be anything including, but not limited to, actual places or scenes; realistic, fanciful, or imagined images; paintings or photographs; famous people or locations; solid, patterned, random, or other graphics; and the like.

In some embodiments, various aspects of the background or objects in the background is manipulated such as, for example, lighting direction or brightness, color, shade, contrast, texture, shapes of an object, motion of an object, position of an object, and orientation of an object. In some embodiments, the background is not replaced but only one or more of these aspects of the background or objects in the background is altered. Altering or changing the background can be useful, for example, to disguise where a user is currently located, to imply that a user is in a different place, for individual or social amusement or subterfuge.

In another visual effect, the foreground (for example, a person in the foreground) of a picture, video, or other visual information is altered. In one embodiment, the foreground image is determined and then removed or altered and replaced by a new foreground image. As an example, a user may alter his or her image to present different characteristics or a different appearance or to emphasize or deemphasize certain characteristics. As another example, the current appearance of the user may not be acceptable to the user (for example, the user may have just woken up or may be dirty from working outside) and the user may wish to show himself or herself in better clothes or with his or her hair styled or washed up, etc. In other embodiments, the user may wish to appear as another person or object or as a caricature or animated character. Other alterations include changes in lighting, color (including color of clothing), orientation, motion, position, brightness, and texture. It will also be recognized that foreground images other than an image of the user can be replaced or altered. Alterations can be made that are, should be, or may be apparent to the receiving party. In some embodiments, the alterations are made so that the alteration is or is believed to be undetectable by the receiving party.

The audio and visual effects generators allow a user to control elements of information sent to the other telephone. This permits the user to direct the awareness of the other party in ways that the user wishes. Alteration of the audio signal/graphics files can be useful to the user in communicating with others. Alteration of the audio signal/graphics files can also be done for amusement and other purposes.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A device, comprising:
   a telephone accessory configured and arranged to transmit an audio signal; and
   an audio effects generator coupled to the telephone accessory and configured and arranged to produce at least one user-initiated audio effect that is transmitted as part of the audio signal, wherein the at least one user-initiated audio effect comprises an audio effect that simulates notification of an incoming call on a separate line.

2. The device of claim 1, wherein the at least one user-initiated audio effect further comprises an audio effect that simulates degradation in the quality of a telephone connection or simulates interference or renders a voice unintelligible.

3. The device of claim 1, wherein the at least one user-initiated audio effect further comprises a gap in the audio signal.

4. The device of claim 3, wherein the gap in the audio signal is repeated at random intervals.

5. The device of claim 1, wherein the at least one user-initiated audio effect further comprises raising or lowering a pitch of a voice in the audio signal.

6. The device of claim 1, wherein the at least one user-initiated audio effect further comprises an audio effect that masks a voice in the audio signal.

7. The device of claim 1, wherein the at least one user-initiated audio effect further comprises an audio effect that alters an accent of a voice in the audio signal.

8. The device of claim 1, wherein the at least one user-initiated audio effect further comprises translating at least a portion of the audio signal.

9. The device of claim 1, wherein the at least one user-initiated audio effect further comprises a background noise comprising traffic or office noise.

10. The device of claim 1, the telephone accessory comprises a telephone headset.

11. The device of claim 1, wherein the telephone accessory comprises an automobile "hands free" system.

12. The device of claim 1, further comprising a recorder configured and arranged to record at least one of the user-initiated audio effects.

13. The device of claim 1, further comprising a telephone coupled to the telephone accessory and configured and arranged to receive the audio signal.

14. A method of using a telephone accessory, the method comprising:
- transmitting an audio signal using the telephone accessory; and
- activating an audio effects generator coupled to the telephone accessory to produce at least one user-initiated audio effect that is transmitted as part of the audio signal, wherein the at least one user-initiated audio effect comprises an audio effect that simulates notification of an incoming call on a separate line.

15. The method of claim 14, wherein activating an audio effects generator comprises actuating one or more buttons or keys on the telephone accessory to activate the audio effects generator.

16. The method of claim 14, further comprising actuating one or more buttons or keys on the telephone accessory to modify a characteristic of the user-initiated audio effect.

17. The method of claim 14, wherein the telephone accessory is a telephone headset or an automobile "hands free" system.

18. The device of claim 13, wherein the telephone is wirelessly coupled to the telephone accessory.

19. The method of claim 14, wherein transmitting the audio signal comprises transmitting the audio signal to a telephone.

* * * * *

UNITED STATES PATENT AND TRADEMARK OFFICE
CERTIFICATE OF CORRECTION

PATENT NO. : 7,599,719 B2
APPLICATION NO. : 11/058488
DATED : October 6, 2009
INVENTOR(S) : John D. Patton

It is certified that error appears in the above-identified patent and that said Letters Patent is hereby corrected as shown below:

On sheet 6 of 7, in Figure 6, Box 156, line 1, delete "MICORPROCESSOR" and insert -- MICROPROCESSOR --, therefor.

In column 10, line 64, in claim 10, after "1," insert -- wherein --.

Signed and Sealed this

First Day of December, 2009

David J. Kappos
*Director of the United States Patent and Trademark Office*